United States Patent [19]

Miyazaki

[11] Patent Number: 4,605,201
[45] Date of Patent: Aug. 12, 1986

[54] BUTTERFLY VALVE
[75] Inventor: Tadao Miyazaki, Shiga, Japan
[73] Assignee: Okumura Engineering Works Co., Ltd., Shiga, Japan
[21] Appl. No.: 187,804
[22] Filed: Sep. 16, 1980

Related U.S. Application Data

[63] Continuation of Ser. No. 35,898, May 3, 1979, abandoned.

[51] Int. Cl.⁴ .............................................. F16K 1/22
[52] U.S. Cl. ..................................... 251/305; 251/306
[58] Field of Search .............................. 251/305, 306

[56]  References Cited
U.S. PATENT DOCUMENTS

| | | | |
|---|---|---|---|
| 2,011,641 | 8/1935 | Kruse | 251/305 |
| 3,263,960 | 8/1966 | Trefil et al. | 251/306 |
| 4,111,395 | 9/1978 | Sheppard | 251/306 |

FOREIGN PATENT DOCUMENTS

| | | | |
|---|---|---|---|
| 583610 | 8/1933 | Fed. Rep. of Germany | 251/306 |
| 1011683 | 7/1957 | Fed. Rep. of Germany | 251/306 |

Primary Examiner—Martin P. Schwadron
Attorney, Agent, or Firm—Koda and Androlia

[57] ABSTRACT

A butterfly valve of the type including a valve casing, a seat ring provided in the valve casing and a butterfly rotatably provided in the valve casing. The butterfly valve further includes a pair of semicircular sealing projections formed on the sheet ring. The sealing projections are arranged and configured such that one sealing projection engages with one side of the butterfly while another sealing projection engages with another side of the butterfly whereby a butterfly valve with an excellent seal is formed.

2 Claims, 8 Drawing Figures

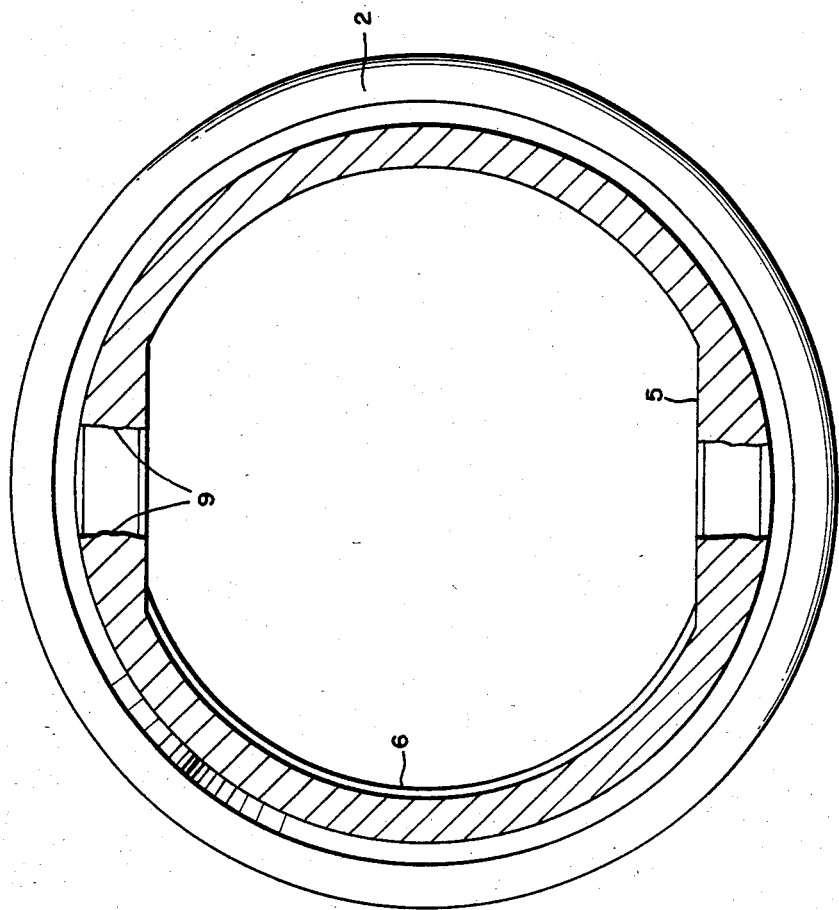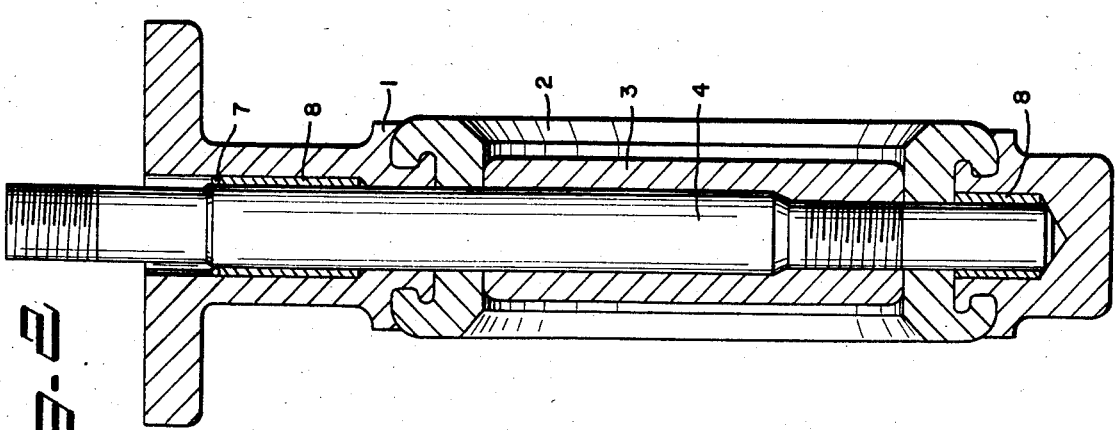

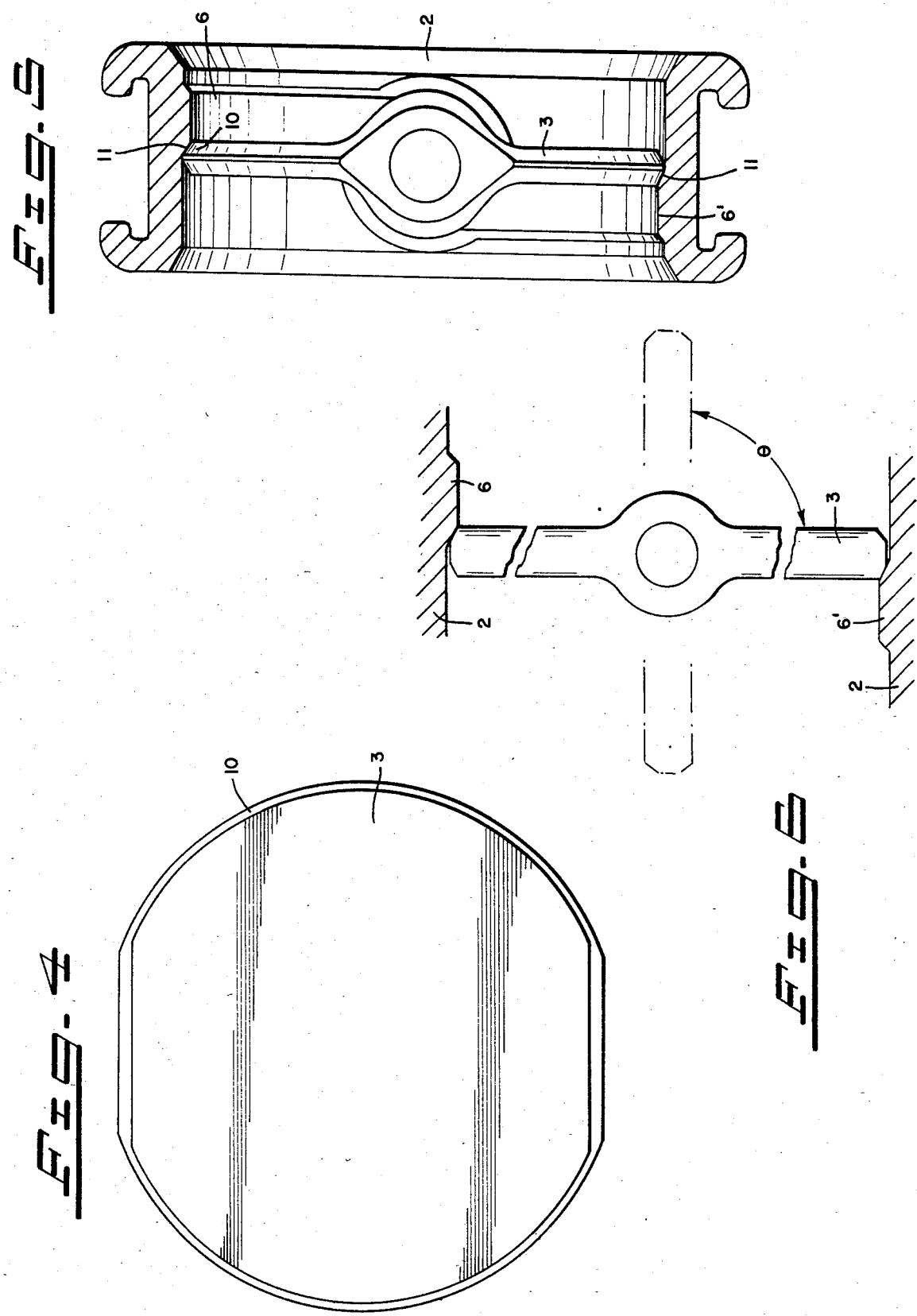

BUTTERFLY VALVE

This is a continuation of application Ser. No. 35,898, filed May 3, 1979, now abandoned.

BACKGROUND OF THE INVENTION

1. Field of the Invention

This invention relates to butterfly valves and more particularly to improvements in the sealing structure of a butterfly valve.

2. Prior Art

In the butterfly valve prior art, the seal is created by the pressurized contact of the valve with the inner surface of a seat ring in a radial direction. For example, as shown in FIG. 7, butterfly valves have been constructed with the valve 3 thrusting against the inner surface of seat ring 2 to close the valve; or, as shown in FIG. 8, butterfly valves have been constructed with the valve 3 having a pressurized contact with the top of a circular projection 12 formed in the inner surface of the seat ring 2. However, in the structure of FIG. 7, the valve 3 illustrated in the one dot chain line fits the seat ring 2 before reaching the closed position illustrated by the solid line and the distance S between the two positions represents a disadvantage in that the valve 3 thrusts against the inner surface of the seat ring 2 and therefore a force works against the seat ring 2 whenever the valve is opened or closed. As a result, not only is the rotational torque required to open and close the butterfly valve larger but also the additional force damages the seat ring. In the structure of FIG. 8, the distance S is as small as possible by means of making a circular projection 12 in the inner surface of the seat ring 2 to make a pressurized contact with the circumference of the valve with the top of the circular projection 12. In such a structure, the sealing efficiency in the closed position is inferior to that of FIG. 7 because there is a fixed value of sealing pressure when the valve 3 makes pressurized contact with the circular projection 12.

SUMMARY OF THE INVENTION

Accordingly it is the general object of the present invention to provide a butterfly valve wherein the circumference of the valve does not press into the inner surface of the seat ring when the valve is in the closed position.

It is another object of the present invention to provide a butterfly valve having excellent sealing efficiency.

In keeping with the principles of the present invention, the objects are accomplished by a unique butterfly valve of the type including a valve casing, a seat ring provided in the valve casing and a butterfly rotatably provided in the valve casing and engaging with the seat ring. The butterfly valve further includes a pair of semicircular sealing projections formed on the seat ring. The sealing projections are arranged and configured such that one sealing projection engages with one side of the butterfly while another sealing projection engages with another side of the butterfly whereby a butterfly valve with an excelent seal is formed.

BRIEF DESCRIPTION OF THE DRAWINGS

The above mentioned features and objects will become more appraent with reference to the following description taken in conjunction with the accompanying drawings wherein like reference numerals denote like elements and in which:

FIG. 2 is a vertical cross section of FIG. 1;

FIG. 3 is a vertical cross section illustrating one embodiment of a seat ring in accordance with the teachings of the present invention;

FIG. 4 is a rear view of a butterfly valve in accordance with the teachings of the present invention;

FIG. 5 is a transverse sectional view illustrating the seal formed by the contact of the valve with the seat ring;

FIG. 6 illustrates the movement of the valve; and

DETAILED DESCRIPTION OF THE INVENTION

Figure 1:
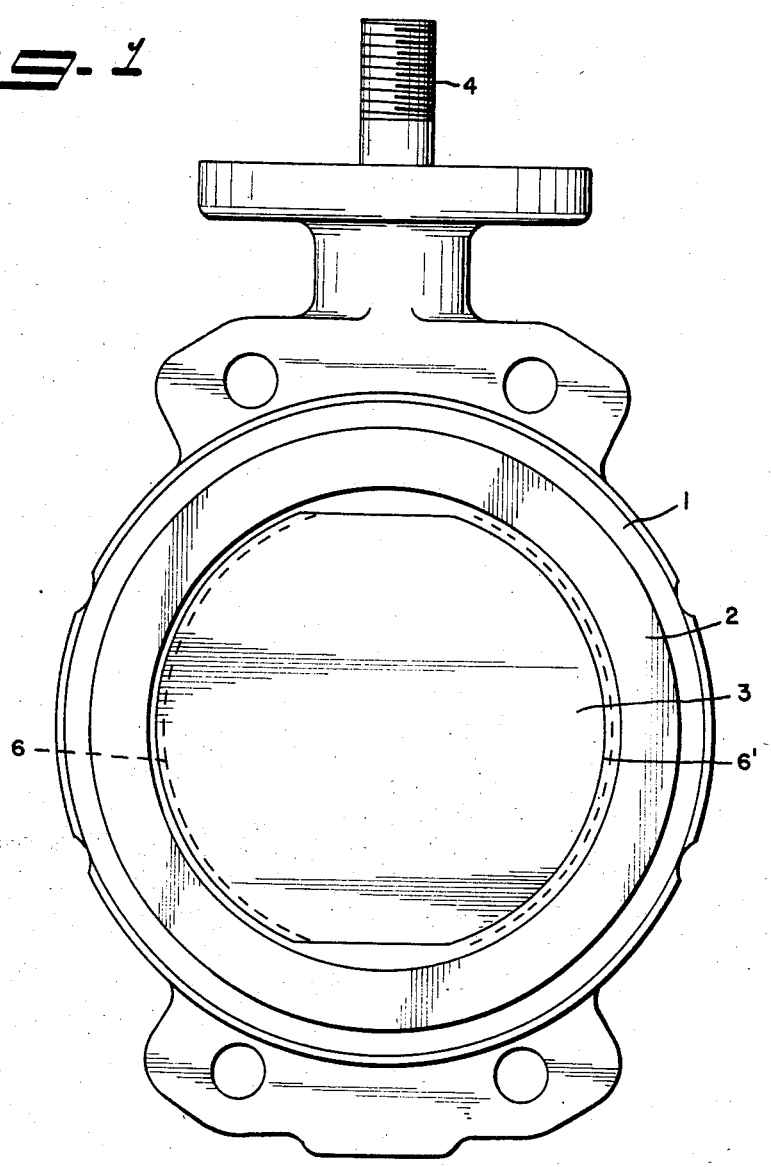
FIG. 1 is a front view illustrating one embodiment of a butterfly valve in accordance with the teachings of the present invention.
Figure 7:
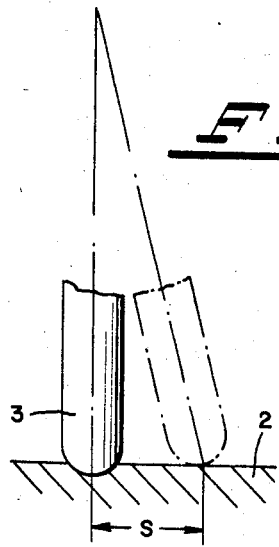
FIGS. 7 and 8 illustrate the movement of prior art butterfly valves.
Figure 8:
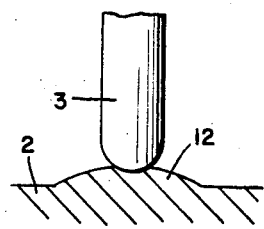

Referring more particularly to the figures, shown in FIGS. 1 and 2 is a butterfly valve in accordance with the present invention. In the figures the butterfly valve includes a valve body 1 having a seat ring 2 provided therein. The seat ring 2 is made of an elastic material such as rubber, etc. A valve 3 is mounted on a valve axle 4 which is inserted into the valve body 1. The valve 3 is rotatable along with the rotation of the valve axle 4. The inner surface of seat ring 2, except at axle hole 5 for inserting the valve axle 4, is provided with semicircular projection 6 and 6' to which both sides of the valve 3 engage when the valve is in the closed position. Furthermore, when the valve is closed, the circumference of the valve 3 is sealed against the sloping surfaces of the inward semicircular projections 6 and 6' (one to the front side and another to the back side, see FIG. 5).

The butterfly valve further includes an O-ring 7, a bushing 8 and a loop projection 9 to prevent leakage caused by the valve axle 4.

In operation, closing and shutting the flow way is accomplished by means of rotating the valve 3 and making the circumference of the valve 3 form a seal by pressing against the sloping surface of the semicircular projections 6 and 6' formed in the inner surface of the seat ring 2. Accordingly, with the above described structure an improved seal is formed by means of high pressure sealing pressure to close the flow way according to the excessive portion of rotary angle $\theta$ in the valve 3, as shown in FIG. 6. In other words, an improved seal is created between the circumference of the valve 3 and the sloping surfaces of the inward projections 6 and 6'. Another feature of this structure is that the rotary torque required to close the valve is small. Namely, in the above described strucutre, the valve 3 is not forced into the inner surface of the seat ring 2 as it is in the prior art and is sealed by pressing against the sloping surfaces of the projection 6 and 6'. Therefore, the valve requires less power to open and close and no damage is done to the seat ring 2.

Furthermore, since rubber is very suitable for use with a fluid, it is preferable as material for the seat ring 2. Since the rubber material has different shrinkage coefficients as a result of the vulcanizing process, forming the seat ring 2 with only one metal mold causes different interior diameters thereof when various materials are used for the seat ring 2. In the prior art, this type of metal mold produces a imperfect sealing condition between the valve 3 and the seat ring 2 or the deflection of the sealing pressure is reduced. Therefore, if one desires to construct a butterfly valve having a good seal, it is necessary to prepare several kinds of metal molds for the seat ring 2 in accordance with the type of material utilized. However, in the present invention, the seat ring 2 is formed so that a seal is created between the circumference of the valve 3 and the sloping surface of the projections 6 and 6' so that regardless of any small differences in its interior diameter, it is no problem to form a seal between the butterfly 3 and the seat ring 2. Furthermore, in the present invention, there are no problems maintaining a sealing pressure and when various types of rubber materials are used for the seat ring 2, one metal mold is sufficient to make all the seat rings 2.

Referring to FIG. 5, shown therein are the preferred shapes which should be adopted to form that seal. In particular, the circumference of the valve 3 should be a taper 10 and the projections 6 and 6' of the seat ring 2 should be in the shape of almost sectional trapezoids wherein the slopes 11 formed correspond to the taper 10. In this matter, it is possible to increase the sealing pressure by means of the thrusting action of the taper 10 in the closed position so long as a tilt angle of the taper 10 is a little smaller than the angle of the slope 11 of the projection 6 and 6'; for example, the tilt angle of the taper 10 is 15° and the angle of the slope 11 is 30°. In addition, it is also preferable to form the inward projections in the shape of sectional turned trapezoids.

From the above it should be apparent that with the above described construction, the improved effects of the present invention can be expected in spite of the shape of the circumference of the valve 3 since the pressing action of the valve 3 against the semicircular projection 6 and 6' forms a perfect seal.

It should be apparent to those skilled in the art that the above described embodiment is merely illustrative of but one of the many possible specific embodiments which represent the application of the principles of the present invention. Numerous and varied other arrangements can be readily devised by those skilled in the art without departing from the spirit and scope of the invention.

I claim:

1. A butterfly valve comprising a valve casing; a seat ring provided in the valve casing and having a pair of semi-circular sealing projections; and a disc rotatably provided in the valve casing forming a seal with the ring, wherein said disc is provided with a taper in circumference thereof, said semi-circular sealing projections are provided with sloping side surfaces which engage respectively with one side and another side of said taper of said disc and a tilt angle of said taper is smaller than a sloping angle of said sloping side surfaces of said sealing projections taken with respect to a plane parallel to a direct of flow through said valve.

2. A butterfly valve according to claim 1, wherein said semi-circular sealing projections are formed approximately trapezoidal in section, the width of the top and the bottom of said trapezoidal projections being at least as large and twice as large as respectively the thickness of said disc measured at the circumference thereof.

* * * * *